US007513557B2

(12) United States Patent
Leigh-Monstevens

(10) Patent No.: US 7,513,557 B2
(45) Date of Patent: Apr. 7, 2009

(54) SEATING AND PROTECTOR ACCESSORY

(75) Inventor: Keith V. Leigh-Monstevens, Rochester Hills, MI (US)

(73) Assignee: Tale-Gator Distributors, LLC, Troy, MI (US)

( * ) Notice: Subject to any disclaimer, the term of this patent is extended or adjusted under 35 U.S.C. 154(b) by 0 days.

(21) Appl. No.: 11/697,339

(22) Filed: Apr. 6, 2007

(65) Prior Publication Data

US 2008/0246298 A1 Oct. 9, 2008

(51) Int. Cl.
*B60N 2/00* (2006.01)

(52) U.S. Cl. ........................................ 296/64; 296/57.1

(58) Field of Classification Search .................. 296/64, 296/57.1, 65.05; 297/344.18, 170, 153
See application file for complete search history.

(56) References Cited

U.S. PATENT DOCUMENTS

D121,266 S * 7/1940 Archer .................... 297/250.1
2,702,076 A * 2/1955 Beardsley et al. ........... 297/252
3,821,825 A * 7/1974 Bailey ................... 297/344.24
4,079,992 A * 3/1978 Thrift et al. .............. 297/183.5
4,111,481 A * 9/1978 Nix et al. ................... 296/39.2
4,884,838 A * 12/1989 Slater ........................ 296/57.1
5,000,504 A * 3/1991 Munguia ................... 296/57.1
5,215,346 A * 6/1993 Reitzloff et al. ............... 296/51
5,255,464 A * 10/1993 Marecek ....................... 40/591
5,360,250 A * 11/1994 Wood et al. ................ 296/39.2
5,462,334 A * 10/1995 Sedorcek et al. ............ 297/252
5,516,193 A * 5/1996 Simpson ..................... 297/252
5,551,742 A * 9/1996 Martindale et al. ......... 296/39.2
5,695,235 A * 12/1997 Martindale et al. ......... 296/39.2
5,806,909 A * 9/1998 Wise ......................... 296/39.2
5,971,464 A * 10/1999 Davis et al. ................ 296/57.1
5,975,610 A * 11/1999 Tracy ........................ 296/57.1
6,116,676 A * 9/2000 Edwards ...................... 296/64
6,203,108 B1 * 3/2001 Mattison, Jr. ............... 297/352
6,206,445 B1 * 3/2001 Brooks ...................... 296/57.1
6,247,742 B1 * 6/2001 Boudreaux ................. 296/57.1
6,273,504 B1 * 8/2001 Pace et al. ............... 297/219.1
6,286,885 B1 * 9/2001 Ramos ........................ 296/64
6,364,391 B1 * 4/2002 Everett ....................... 296/57.1
6,431,630 B1 * 8/2002 Meinke ..................... 296/57.1
6,478,355 B1 * 11/2002 Van Eden et al. .......... 296/37.6
6,575,516 B2 * 6/2003 Webber ....................... 296/61
6,588,822 B1 * 7/2003 Duvall, Jr. ................. 296/57.1
D479,499 S * 9/2003 Cameron et al. ........... D12/221
6,824,186 B2 * 11/2004 Brown ..................... 296/65.16

(Continued)

*Primary Examiner*—Kiran B. Patel
(74) *Attorney, Agent, or Firm*—Young Basile

(57) ABSTRACT

An accessory for use for the inside surface and the upper edge surface of a pickup truck tailgate. The accessory comprises a unitary member of plastic sheet material including a generally planar base portion, configured to overly and cover the inside surface of the tailgate and defining at least one upwardly opening seating surface configured to accommodate a human posterior, and a lip portion contiguous with an edge of and extending at an angle with respect to the base portion and configured to overlie and protect the upper edge surface of the tailgate with the base portion installed on the inside surface of the tailgate. A backrest is associated with the seating surface and is pivotally moveable between an upright position providing back support for a person sitting on the seating surface and a lowered stowed position within the concavity of the seating surface. The seating and protector accessory is secured to the tailgate using suitable fasteners coacting with the tailgate.

10 Claims, 5 Drawing Sheets

U.S. PATENT DOCUMENTS 6,874,839 B2 * 4/2005 Acker et al. ............... 296/57.1
6,908,150 B1 * 6/2005 Wegner et al. ........... 297/217.1
7,201,424 B1 * 4/2007 Fournier .................... 296/57.1
2002/0109369 A1 * 8/2002 Boomhower et al. ....... 296/57.1
2004/0256897 A1 * 12/2004 Ziegler .................. 297/215.12
2004/0262345 A1 * 12/2004 Polburn et al. .............. 224/275
2007/0182193 A1 * 8/2007 Fournier ...................... 296/64

* cited by examiner

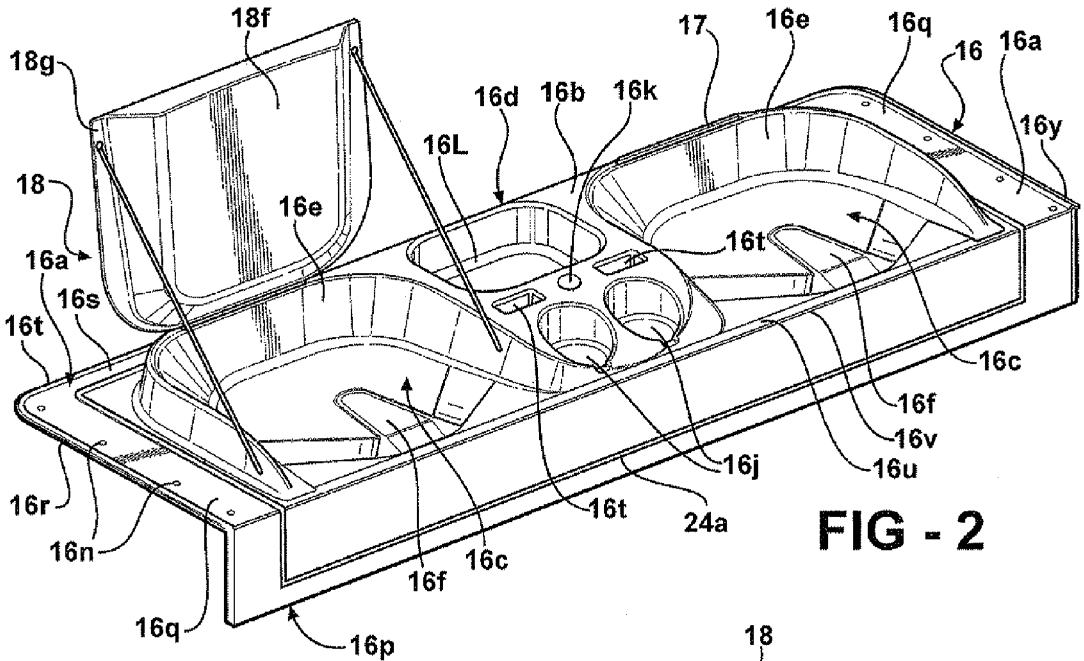
FIG - 2
FIG - 3
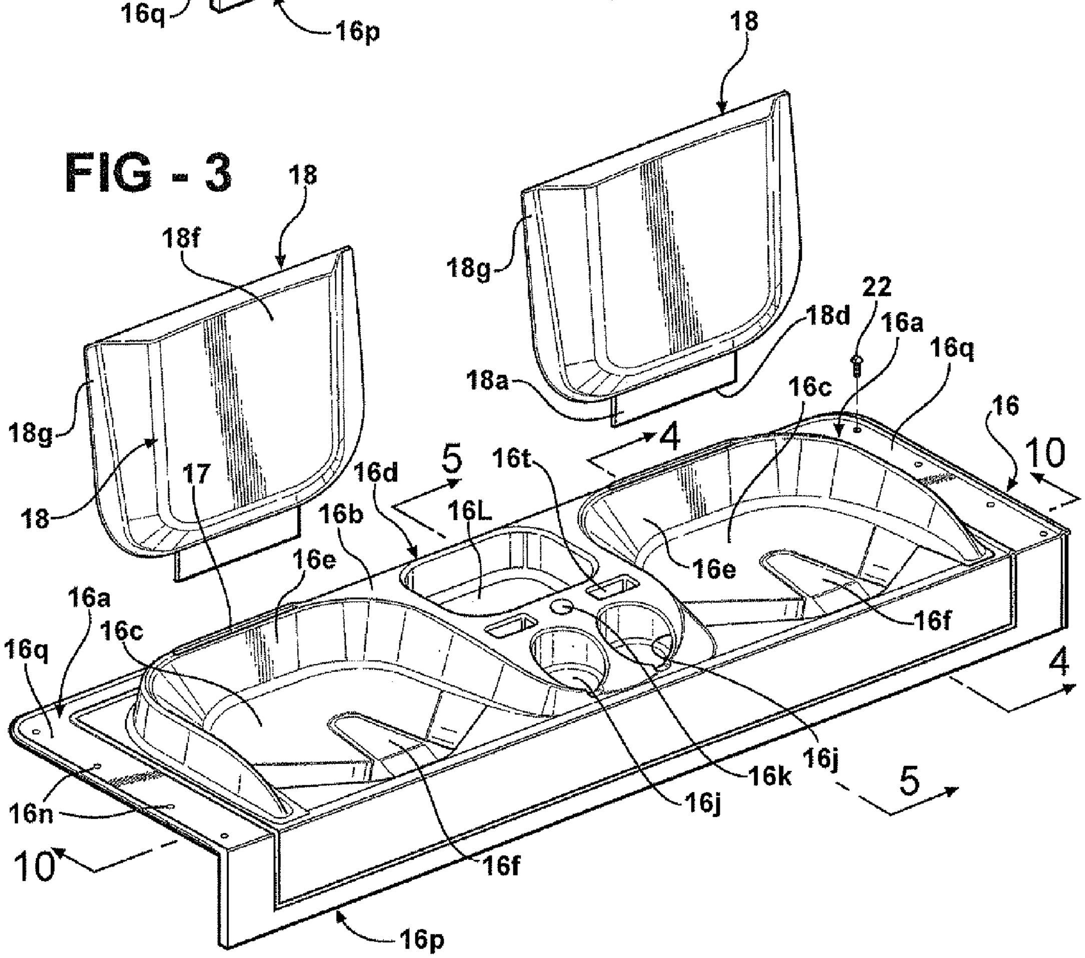

SEATING AND PROTECTOR ACCESSORY

FIELD OF THE INVENTION

This invention relates to motor vehicle accessories and more particularly to an accessory which may be used in association with the inside surface of a lowered tailgate of a pickup truck to provide comfortable outdoor seating and which further provides protection for the upper edge surface of the tailgate.

BACKGROUND OF THE INVENTION

It is common practice at outdoor activities, such as sporting events, to lower the tailgate of a truck to provide a horizontal support surface for dining, seating, game playing or the like. However, for purposes of seating, the surface of a lowered tailgate is not comfortable, especially for extended periods of usage. Further, it is desirable to provide protection for the upper edge surface of the tailgate to preclude damage to the tailgate upper edge during usage either in the lowered position or in the upright closed position and for this purpose tailgate protectors are available for installation on the upper edge of the tailgate.

SUMMARY OF THE INVENTION

This invention relates to a seating and protector accessory for the tailgate of a pickup truck.

More particularly this invention relates to an accessory for use with the inside surface and upper edge surface of a tailgate to provide comfortable seating on the tailgate and to protect the upper edge surface of the tailgate.

According to the invention, the accessory comprises a unitary member of sheet material including a generally planar base portion, configured to overly and cover the inside surface of the tailgate and defining at least one upwardly opening seating surface configured to accommodate a human posterior, and a lip portion contiguous with an edge of and extending at an angle with respect to the base portion and configured to overly and protect the upper edge surface of the tailgate with the base portion installed on the inside surface of the tailgate.

According to a further feature of the invention, the base portion has a generally rectangular configuration including a front edge, a rear edge, and side edges, the seating surface is concave and opens proximate the front edge of the base portion; and the lip portion is contiguous with the front edge of the base portion and extends substantially normal to the plane of the base portion.

According to a further feature of the invention, the base portion is configured to define planar flange areas proximate the side and rear edges of the base portion in surrounding relation to the seating surface, and indicia lines are provided on the planar flange areas and on the lip portion to facilitate selective cutting of the planar flange areas and the lip portion along the indicia lines to selectively accommodate various size tailgates.

According to a further feature of the invention, the accessory further includes a seat back conforming in shape and size to the seating surface and an attachment member for attaching the seatback to the base portion rearwardly of the seating surface and proximate the rear edge of the base portion.

According to a further feature of the invention, the planar flange areas contact the inside surface of the tailgate and operate to raise the seating surface above the level of the inside surface.

According to a further feature of the invention, the seating surface is concave and opens proximate the front edge of the base portion; the planar flange contact areas include a rear contact area rearwardly of the seating surface and proximate the rear edge of the base portion, side contact areas proximate the side edges of the base portion in flanking relation to the seating surface, and a front contact surface area forwardly of the seating surface and proximate the front edge of the base portion; and the lip portion is contiguous with the front contact surface and forms an angled extension of the front contact surface.

The invention also provides a method of providing a seating surface on the inside surface of a vehicle tailgate and a protector for the upper edge of the tailgate. The invention method comprises providing a unitary member of sheet material; shaping the unitary member to provide a generally planar base portion, conforming in size and shape to the inside surface of the tailgate and defining an upwardly opening seating surface configured to accommodate a human posterior, and a lip portion contiguous with an edge of an extending at an angle with respect to the base portion; and attaching the unitary member to the tailgate with the base portion overlying the inside surface of the tailgate and the lip portion overlying and protecting the upper edge of the tailgate.

According to a further feature of the invention methodology, the base portion is provided in a size providing planar flange areas in surrounding relation to the seating surface and the planar flange areas are selectively cut away to conform the base portion to various tailgate sizes corresponding to various sizes of pickup trucks.

According to a further feature of the invention methodology, the lip portion is provided in a size to accommodate various tailgate sizes and the lip portion is selectively cut away to conform the lip portion to various tailgate sizes.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a perspective view of the accessory;

FIG. 3 is a perspective exploded view of the accessory;

DETAILED DESCRIPTION OF THE PREFERRED EMBODIMENT

Figure 1:
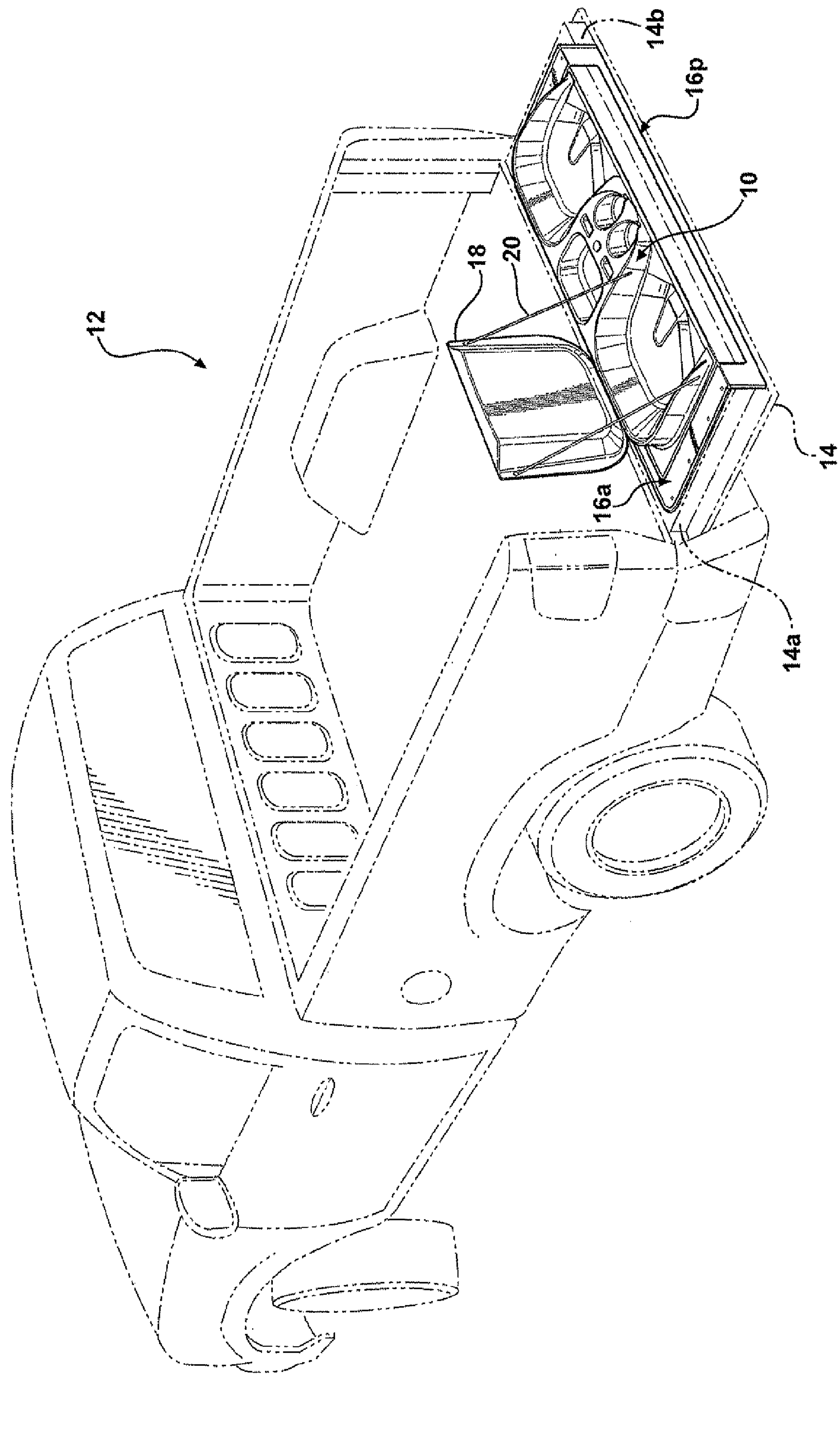
FIG. 1 is a perspective view of a pickup truck, showing a seating and protector accessory embodying the invention installed on the inside surface of a lowered tailgate and protecting the upper edge of the tailgate.

FIG. 1 shows a seating and protector accessory 10 installed on the inside surface of a tailgate 14 hingedly installed on a pickup truck 12. The inside surface 14*a* of the tailgate 14 is the support surface for the accessory 10.

The accessory 10, broadly considered, includes a rectangular plastic unitary member 16 and a pair of hinged backrests 18.

Unitary member 16 is formed as a molded sheet of plastic material having a generally rectangular configuration. Unitary member 16 may be formed, for example, of a polypropylene UV stabilized material and may be formed in an injection molding operation. Plastic is mentioned by way of example, but the unitary member may alternatively be made of other material such as aluminum, steel, rubber or carpeting.

Unitary member 16 defines a flat planar base portion 16*a* and a lip portion 16*p*.

With the accessory installed on the tailgate inside surface 14*a*, the base portion 16*a* defines a raised deck 16*b* and, within the deck portion, a pair of spaced-apart recesses 16*c* defining seating surfaces sized and shaped to receive a human posterior. The bottoms of the seating surfaces 16*c* lie above the plane of the base portion 16*a* and, therefore, are not grounded to the inside surface 14*a* but lie above it to provide resilience for comfort and to provide a cushioning effect.

The positioning of the seating surfaces 16*c* above the inside surface 14*a* is achieved utilizing peripheral planar flange contact areas in surrounding relation to the seating surfaces.

Specifically, base portion 14*a* defines side flange contact areas 16*q* proximate the side edges 16*r* of the base portion and flanking the seating surfaces; a rear flange contact area 16*s* rearwardly of the seating surfaces and proximate the rear edge 16*t* of the base portion; and a front flange contact area 16*u* forwardly of the seating surfaces and proximate the front edge 16*v* of the base portion.

A central convenience section 16*d* is positioned between the seating surfaces 16*c* and includes additional recesses of varying shapes as hereinafter described to accommodate drinks, ice, cigarette packs and other items. The recesses of the convenience section are preferably grounded, that is, the bottoms lie against surface 14*a*, to augment the grounding action of the flange contact areas 16*q*-16*u*. Each seating surface 16*c* is defined as an upwardly-opening, concave area configured to accommodate a human posterior. Surrounding the seating surfaces 16*c* are U-shaped surrounds 16*e* which join the seating surfaces 16*c* to the deck 16*b*. The surrounds 16*e* blend into the convenience section 16*d* at the front of the base member 16 as shown.

Figure 4:
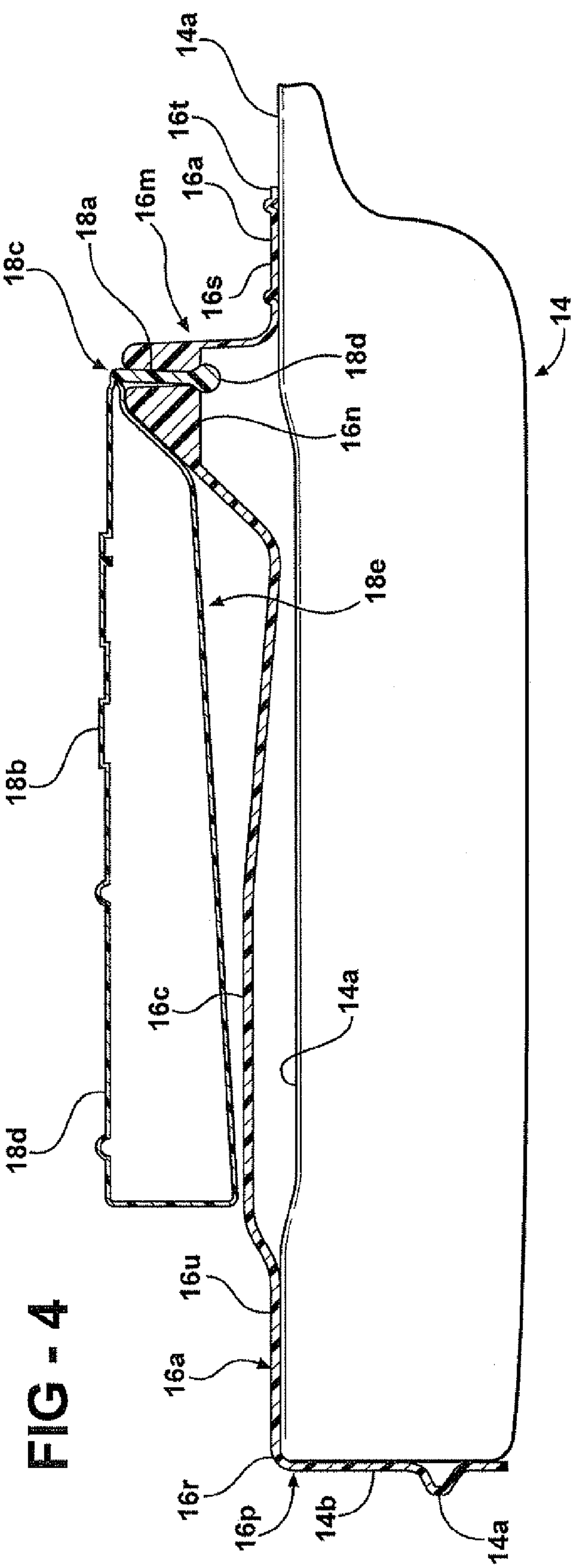
FIGS. 4 and 5 are cross-sectional views taken on lines 4-4 and 5-5 of FIG. 3.
Figure 5:
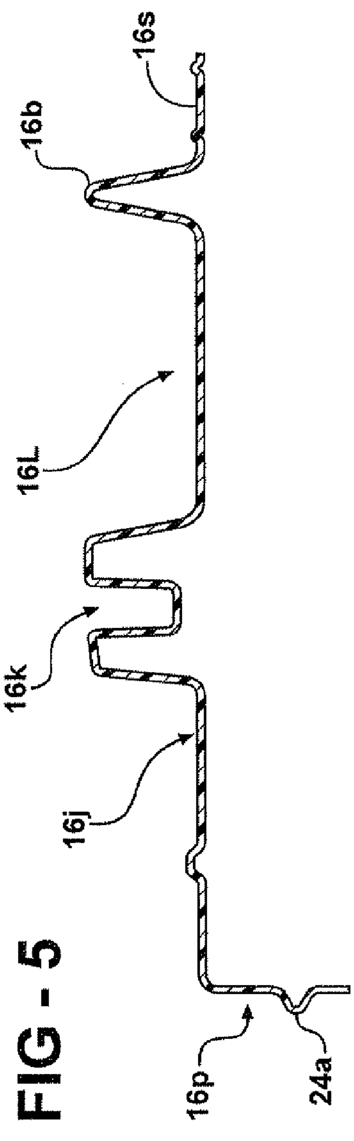

The seating surfaces 16*c* are contoured to receive and conform generally to a human posterior. In the front center of each surface 16*c* is a raised wedge-shaped portion 16*f* which lies between the contact points of a human posterior with the surface 16*c* to provide a feeling to the user similar to that of a motorcycle seat. The flange contact areas and the convenience section contact area serve to position the seating surfaces 16*c* above the ground plane as shown in FIG. 4 to provide flexing under load.

Central convenience section 16*d* defines a pair of cupholders 16*j*, an umbrella holder 16*k*, an all purpose tray 16*l*, and cigarette pack holders 16*t*. The bottoms of cup holder 16*j* and the bottom of tray 16*l* are grounded against surface 14*a*.

Each surround 16*e* has formed in the rear portion thereof a laterally extending slot or socket 17 to receive a backrest 18 as hereinafter described.

A backrest member 18 is provided in association with each seating surface 16*c*. Bach backrest member 18 is pivotally mounted on the base member 16 for movement between an upright operative position in which it defines a backrest surface to support the back of a person positioned on a seating surface 16*c*, and a stowed position in which is overlies the seating surface. In the stowed position, the backrest 18 is positioned in the concavity defining a seating surface 16*c*.

Figure 7:
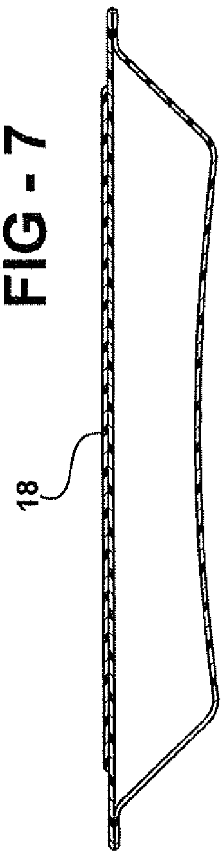
FIG. 7 is a cross-sectional view taken on line 7-7 of FIG. 6.
Figure 6:
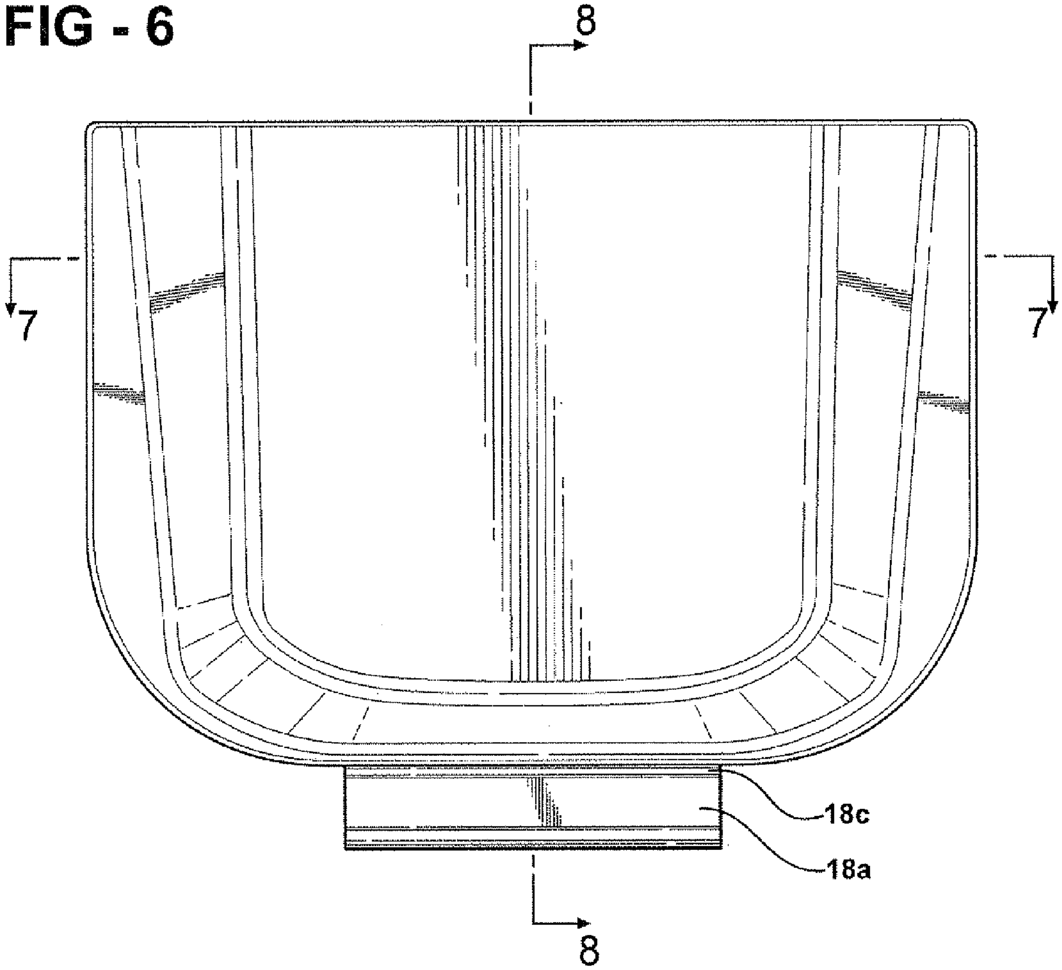
FIG. 6 is a view of a backrest employed in the accessory.
Figure 8:
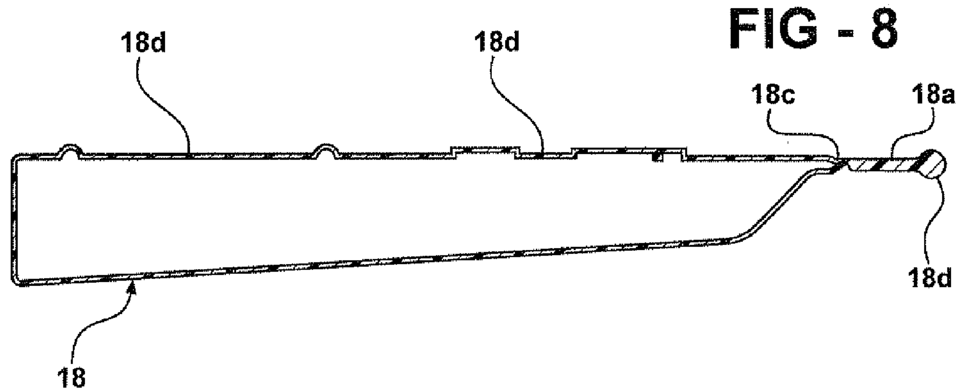
FIG. 8 is a cross-sectional view taken on line 8-8 of FIG. 6.

A pivotal connection of each backrest member 18 to the base member 16 is provided by a tab 18*a* connected to a rear edge of the main body 18*b* of the backrest via a living hinge 18*c* (see FIG. 7). Tab 18*a* is sized to fit into a respective slot 17 with a snap fit employing a bulbous end edge 18*d* coacting with integral ribs 16*n* (FIG. 4). The tab may be easily inserted, will stay in place so long as a backrest support is desired, and may be readily removed to separate the backrest 18 from the base member 16.

Backrest main body 18*b* is preferably formed of a polypropylene plastic material in a blow molding operation using a suitable parison or may be formed of EPP foam. The main body 18*b* of each backrest includes a generally planar back portion 18*d* and a cushion portion 18*e*. The cushion portion 18*e* is configured to be positioned within the concavity of the base member defining the respective seating surface 16*c* with the rear central portion 18*f* of the cushion portion 18*e* suitably bowed to accommodate the raised central plateau portion 16*f* of the seating surface. The cushion portion 18*e* will be seen to be inset with respect to back portion 18*d* along the side and front edges of the backrest to define a peripheral flange 18*g* which may seat along the upper edges of the respective seating surface 16*b* with the cushion portion 18*de* positioned in the concavity of the seating surface.

The movement of each backrest between its upright operative position and its stowed position proximate the base member 16 is provided by the living hinge 18*c* in coaction with the tab 18*a* received in the slot or socket 17. In the upright position, each backrest is further supported by a pair of flexible straps 20 extending from the backrest to the base member. The straps may be made of Nylon webbing and are connected to the accessory structure by rivets or snaps or the like.

Lip portion 16*p* is formed integrally with base portion 16*a* and extends generally normally from the front edge 16*v* of the base portion and specifically forms a contiguous angled extension of the front contact flange area 16*u*. Lip portion 16*p* is sized and configured to overlie and protect the upper edge 14*b* of the tailgate 14 with the base portion 16*b* installed on the inside surface 14*a* of the tailgate.

Accessory 10 is secured to the inside surface 14*a* of the lowered tailgate 14 utilizing fasteners 22 extending through suitable apertures 16*n* provided in the planar flange portions of base portion 16*a* for engagement with suitable apertures in the tailgate inside surface 14*a*. The apertures in the tailgate inside surface may be preexisting or may be formed in the surface 14*a* in a drilling operation. Fasteners 22 may, for example, comprise “Christmas tree” type fasteners extending through respective apertures 16*n* for engagement with suitable apertures in the tailgate.

Figure 9:
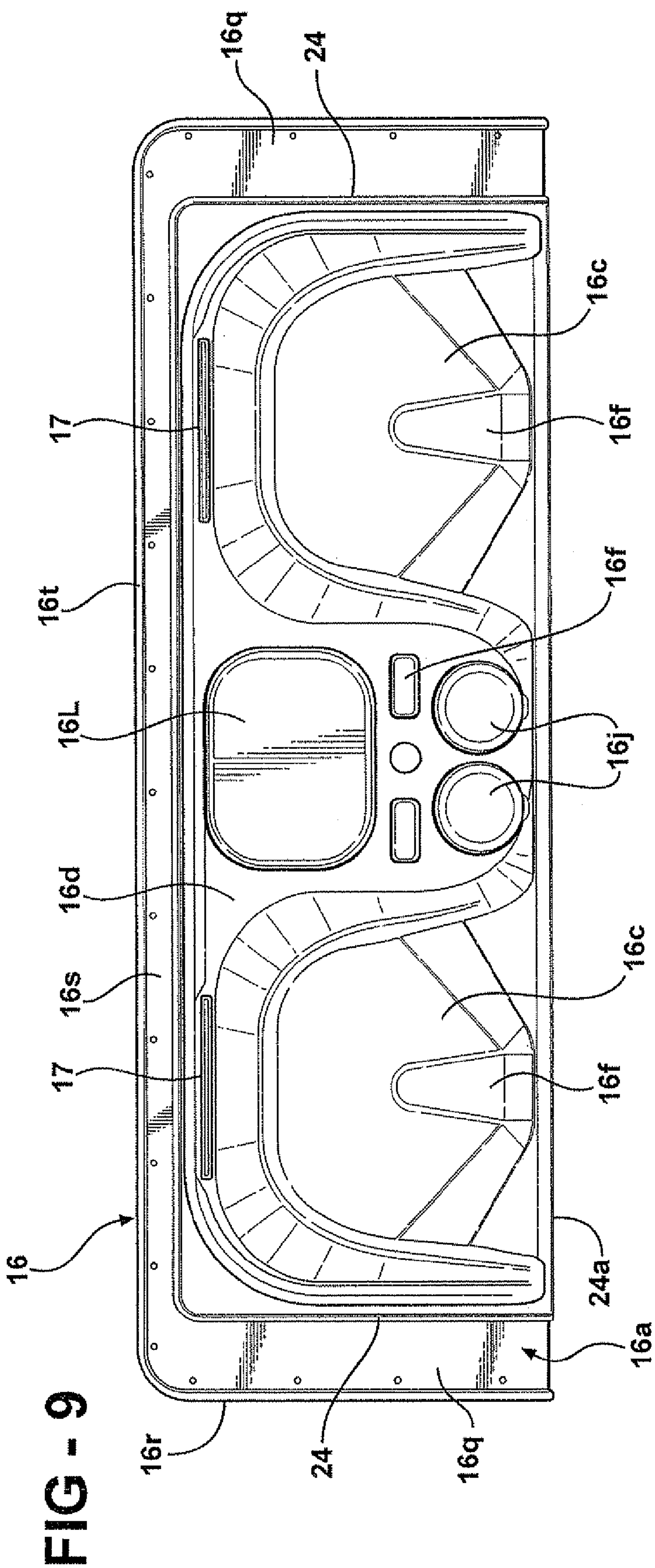
FIG. 9 is a plan view showing the manner in which the accessory of the invention may readily accommodate the tailgates of various size trucks.
Figure 10:
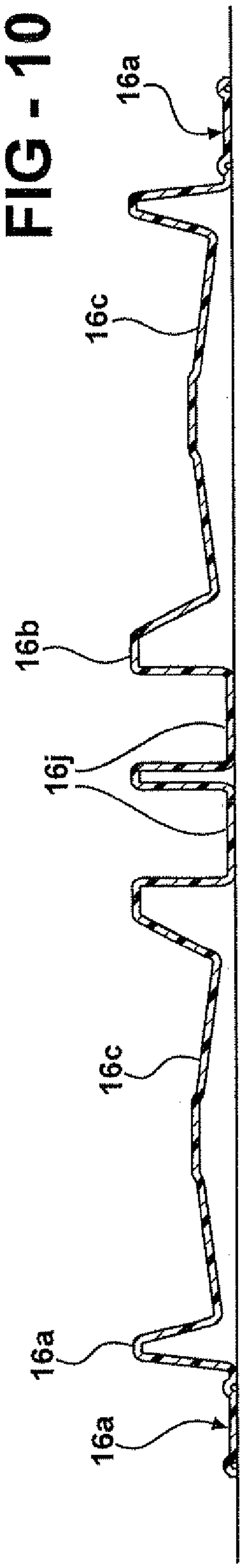
FIG. 10 is a cross-sectional view taken on line 10-10 of FIG. 3.

As best seen in FIG. 9, flange contact areas 16*q* and 16*s* may be provided in a size providing excess planar flange areas proximate the side and rear edges of the base portion in surrounding relation to the seating surfaces 16*c* whereby the excess areas may be selectively cut away to conform the sheet to various tailgate sizes corresponding to various sizes of pickup trucks. Specifically, with continued reference to FIG. 9, base portion 16*a* may be retained in the illustrated, full size solid line configuration to accommodate the relatively large tailgate of a full size pickup truck or may be cut along the indicia/score lines 24 to accommodate the relatively smaller tailgate of a mid-size pickup truck. Similarly, lip portion 16*p* may retain the illustrated full size solid line configuration to overlie and protect the upper edge 14*b* of the tailgate of a full size pickup truck or may be cut along the indicia/score lines 24*a* to accommodate the upper edge 14*b* of the tailgate of a mid-size pickup truck 42.

The invention seating accessory will be seen to provide many important advantages. Specifically, the invention accessory device provides a means of providing ready, comfortable seating in an outdoor environment utilizing the horizontal support surface provided by the inside surface of a lowered tailgate of a pickup truck; the seating accessory further provides protection for the upper edge of the tailgate thereby eliminating the need to purchase and install separate tailgate protectors; the seating accessory may be readily attached to the tailgate; and the accessory, by virtue of its lightweight and compact size, may be readily stowed when not in use. As indicated above, the accessory may be an aftermarket item added to a pre-existing tailgate. Alternatively, it may be integrated into the tailgate by the vehicle manufacturer as original equipment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An accessory for use with the inside surface and upper edge surface of a pickup truck tailgate comprising:

a unitary member of sheet material including a generally planar base portion, configured to overlie and cover the inside surface of the tailgate and defining at least one upwardly opening seating surface configured to accommodate a human posterior, and a lip portion configured to overlie and protect the upper edge surface of the tailgate with the base portion installed on the inside surface of the tailgate;

the base portion having a generally rectangular configuration including a front edge, a rear edge, and a side edge;

the seating surface being concave and opening proximate the front edge of the base portion; and the lip portion being contiguous with the front edge of the base portion and extending substantially normal to the plane of the base portion in overlying and protecting relation to the upper edge surface of the tailgate.

2. An accessory according to claim 1 wherein:

the base portion is configured to define planar flange areas proximate the side are rear edges of the base portion in surrounding relation to the seating surface; and indicia lines are provided on the planar flange areas and on the lip portion to facilitate selective cutting of the planar flange areas and the lip portion along the indicia lines to selectively accommodate various size tailgates.

3. An accessory device according to claim 1 wherein the base member defines two side by side upwardly opening seating surfaces to accommodate two side by side seated persons.

4. An accessory according to claim 1 wherein the unitary member is formed of a single sheet of molded plastic material.

5. An accessory according to claim 4 wherein the unitary member is formed in an injection molded process.

6. An accessory as defined in claim 1 further including a seat back conforming in shape and size to the seating surface and an attachment member for attaching the seat back to the base portion rearwardely of the seating surface and proximate the rear edge of the base portion.

7. An accessory according to claim 1 in combination with the tailgate of a pickup truck, the base portion positioned in overlying covering relation to the inside surface of the tailgate, the lip portion overlying and protecting the upper edge surface of the tailgate.

8. An accessory according to claim 1 wherein the base portion includes planar flange contact areas in surrounding relation to the seating surface and operative in the installed accessory to contact the inside surface of the tailgate and raise the seating surface above the level of the inside surface.

9. An accessory according to claim 8 wherein:

the planar flange contact areas include a rear contact area rearwardly of the seating surface and proximate the rear edge of the base portion, side contact areas proximate the side edges of the base portion in flanking relation to the seating surface, and a front contact area forwardly of the seating surface and proximate the front edge of the base portion; and the lip portion forms an angled extension of the front contact surface.

10. An accessory as defined in claim 1 wherein the seating surface, when installed, is spaced entirely above the inside surface of the tailgate to permit flexing of the sheet material between the seating surface and the inside surface of the tailgate.

* * * * *